United States Patent Office 3,590,107
Patented June 29, 1971

3,590,107
METHOD OF FLAME TREATING SUBBED SHEETS OF LINEAR POLYESTERS PRIOR TO ORIENTATION
Edward W. Smith, Jr., and Arthur W. Spencer, Rochester, N.Y., assignors to Eastman Kodak Company, Rochester, N.Y.
Filed June 26, 1969, Ser. No. 836,911
Int. Cl. B44d 1/092
U.S. Cl. 264—80
6 Claims

ABSTRACT OF THE DISCLOSURE

A method has been found for improving the appearance of sheets of linear polyester which are oriented subsequent to subbing with an aqueous sub containing an "attack" agent (such as resorcinol, for example) which method comprises quickly passing that surface of the sheets which is to be subbed through the primary cone of a hydrocarbon gas flame just prior to application of the sum. As a result, "printoff" defects can be practically eliminated from the sheets.

---

Figure 1:
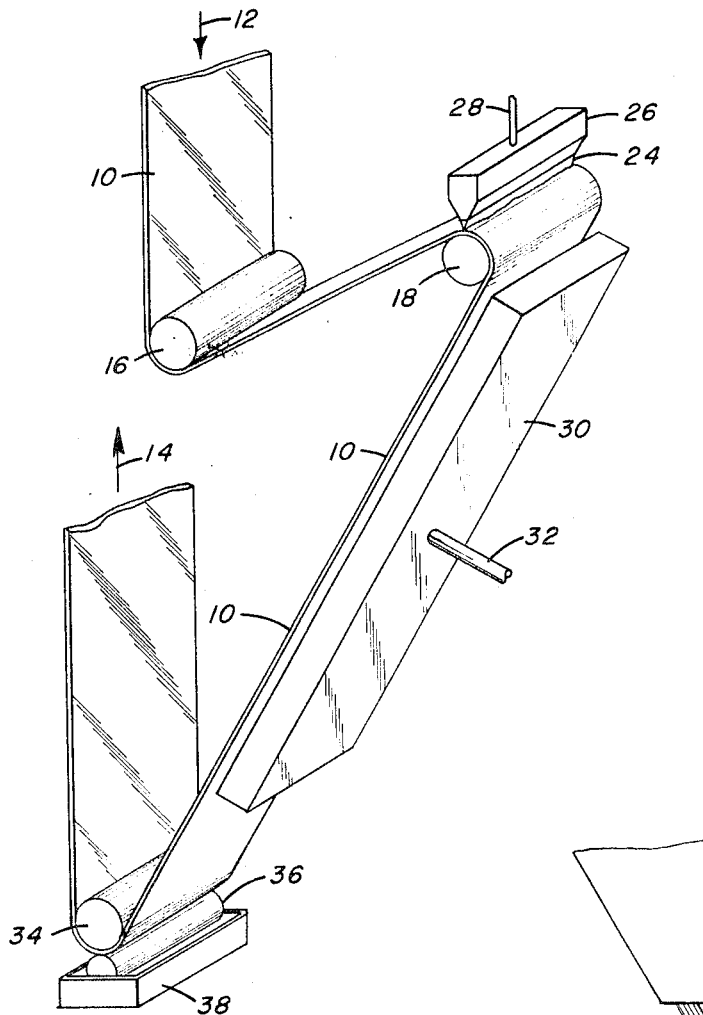

This invention relates to the treatment of the surfaces of sheets of linear polyesters to improve the appearance thereof. More particularly, this invention relates to an improved process for the elimination of the beauty defect commonly known as "printoff" which occurs in such sheets when they are subbed prior to orientation.

The beauty defect known as "printoff" which commonly occurs in thermoplastic polyester sheets and which is particularly deleterious when such sheeting is to be used in applications such as photographic film base where clarity of sheeting is of particular importance has been a recognized problem in the sheeting art for a long time.

Many attempts have been made heretofore to overcome this "printoff" problem, with apparently very little success. The lack of success is believed to be mainly due to the fact that the cause of this defect was not readily recognized.

Thus, it was a surprising discovery that the defect about which the present invention is concerned was caused by a combination of circumstances that apparently occurs only when polyester film is subbed with an aqueous solution or dispersion of a suitable subbing material, which aqueous solution or dispersion contains (in addition to the material which will ultimately form the sub layer or coating on the surface of the film) an "attack" agent or material. Such "attack" agents are often conventionally utilized in such aqueous subbing compositions to aid the sub layer in obtaining a firm grip onto the polyester substrate. Evidently, the "attack" agent functions by softening, swelling, or slightly roughening the surface of the polyester films. In a discovery that made possible the present solution to this troublesome "printoff" problem, it was found that the "attack" agent not only functions (in the highly desirable manner) to aid in the adhesion of the sub, but it also induces a very undesirable amount of crystallization of the polyester at many of the very tiny scratches, abrasions, or other blemishes that are on the surface of the polyester at the time the aqueous sub is applied thereto. This relationship between the undesirable effect (the "printoff" defect that becomes evident only after the subbed film has been oriented), and its cause (which occurs usually at the very beginning of the polyester sheet film manufacturing operation) was extremely difficult to discover, since the blemishes that cause the ultimate problem are generally so tiny that they usually defy detection with ordinary inspection devices and methods.

Illustrative of the generic processes to which this invention relates (wherein the polyester is first subbed with an aqueous subbing composition and subsequently oriented and coated with one or more photosensitive emulsions) are those processes disclosed in U.S. Pats. 2,779,684, 2,627,088 and 2,823,421. Similarly, the generic technology relating to the use of various "attack" agents in such aqueous subbing compositions can be found in several patents, including U.S. Pats. 3,143,421, 3,169,867, 3,337,364, 3,271,178 and 3,201,249. Note that "attack" agents are sometimes referred to as "swelling" agents in the literature. Typical, non-limiting, examples of such useful "attack" or "swelling" agents are resorcinol, trichloroacetic acid, chloral hydrate, trichlorophenol, 1,3-dihydroxybenzene, pyrocatechol, pyrogallol, orcinol, benzophenone, dichloroacetic acid, monochloroacetic acid, trifluoroacetic acid and benzyl alcohol.

It is, therefore, an object of the present invention to provide an improved process whereby "printoff" blemishes that occur when a polyester sheeting is subbed with an aqueous sub prior to orientation can be eliminated.

Other objects and advantages of the present invention will be made obvious to those skilled in the art when the following specification is considered in relation to the accompanying drawing of which:

FIG. I is an elevational view of a preferred embodiment of an apparatus suitable for carrying out the process of the present invention; and FIG. II is a detailed view, on an enlarged scale, of the flame produced in a portion of the apparatus depicted in FIG. I.

The elimination of printoff has been accomplished by searing with a hydrocarbon gas flame, prior to subbing, just the surface of the thermoplastic sheeting to which the sub is to be applied. This technique resembles a fire polishing operation and in effect "heals" the small surface abrasions or scratches produced in the film production process by apparently melting the ragged edges of the abrasions and fusing them into a more homogeneous surface, thus preventing the above-described differential attack or crystallization by removing the potential differential crystallization sites prior to the subbing operation.

Following flaming of the sheet surface, it is necessary to cool the support before allowing the treated side to contact another roll, particularly a cooled roll due to the higher susceptibility of hot support to roll abrasion than cold support. Furthermore, many conventional methods of sub application require that the support be cool at the time of application to insure a quality application.

As should be clear, for maximum benefit, it is necessary to apply the flame treatment of this disclosure after the last transport roll on the side of the sheeting or support where the sub is being applied.

The process will now be described in connection with the flame treating of the surface of a sheet of a linear polyester. It should be understood, however, that the process may also be employed for treating the surface of other objects made of or coated with linear polyesters which for any of a variety of reasons may be subsequently coated with a subbing solution containing an "attack" agent and subsequently oriented by any of a variety of means, and where the elimination of "printoff" may be desirable.

Figure 2:
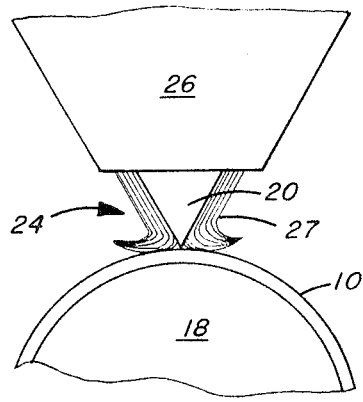

FIG. 1 shows a preferred embodiment of an apparatus suitable for performance of the method disclosed herein. The sheet of polyester material 10 travels through the apparatus in the direction indicated by arrows 12 and 14. As the sheet passes over the last transport roll 16 the surfaces away from the roll so that a minimum of abrasion face thereof which is to ultimately receive the subbing will occur. The sheet leaves transport roll 16 and advances to roller 18 which can be and preferably is temperature controlled as described below. As the sheet passes over roller 18 the surface to be subbed is flame treated by passage thereof through the primary cone 20 of the flame 24 which emanates from the ribbon burner 26. A typical flame 24 emerging from the ribbon burner 26 is shown in FIG. 2. Each of these flames 24 is made up of a primary cone 20 and a secondary cone 27 and it is critical to the successful practice of the instant invention that the surface of sheet 10 which is to be subbed pass through the primary cone 20 and preferably at about the tip of primary cone 20 to achieve the desired surface searing.

Ribbon burner 26 is supplied with a hydrocarbon fuel and oxygen or air mixture through inlet 28. The nature of this mixture will be described more fully below.

Once flame treatment has been performed sheet 10 and in particular the surface to be subbed is preferably passed under or by a cooling plenum 30 where air or some other suitable gas which is cooled or at room temperature and is pumped through plenum inlet 32 impinges upon the film and cools the same. Of course, the use of such a plenum is not critical and methods using cooling in air or no cooling at all can be utilized if the subbing applied permits such a process or spatial requirements permit large air cooling areas.

After cooling, the sheet passes over subbing roll 34 which again can, but need not, be temperature controlled depending upon the nature of the sub being applied. As the sheet passes over roll 34 the flame treated surface is subbed by contact with a liquid bead near transfer roll 36 rotating in a reservoir 38 of a suitable and desirable subbing solution. From this point on, conventional sub drying and curing and sheet treatment or orientation procedures can be performed in any conventional manner desired.

From the above, it should be clear that the method of this invention can be carried out in a relatively small area and with only relatively minor variations and modifications of existing sheet processing equipment. This is an advantage, the importance of which will be readily apparent to one skilled in the polyester sheet manufacturing art.

Since the specific "printoff" problems described hereinabove apparently exist only when linear polyester sheets made up of polyesters having repeating glycol and diacyl residues in their chains (such as those polyesters described in U.S. Pat. No. 3,075,952), which polyesters have molecular weights of at least about 10,000 and intrinsic viscosities of at least about 0.5, for example, sheets of poly (ethylene terephthalate), poly(1,4-dimethylene cyclohexylene terephthalate and the like are treated in processes involving the manufacture of oriented (i.e., drafted, tentered, and heat set) sheets of such materials which have been subbed with an aqueous sub or subbing solution or dispersion containing a so-called "attack agent" which induces crystallization or crystal formation at any point on the surface of the sheet where there is a nick, scratch or abrasion site prior to the performance of the orientation operation, the present invention is limited to such processes.

In the case of the aforementioned linear polyester sheet materials, the attack agents which are contained in the subbing material and which tend to induce the above-described preferential crystallization are generally those such as 1,3-dihydroxybenzene, phenol, trichloroacetic acid, dichloroacetic acid, resorcinol, 4-chlororesorcinol, 2,4-dihydroxy toluene, trichlorophenol, chloral hydrate, trifluoracetic acid and the like in the preferred case of poly(ethylene terephthalate). In the case of copolyesters or alkylene diol modified linear polyesters of poly(ethylene terephthalate), subs containing resorcinol are particularly grievous offenders in the area of production of printoff defects.

Quite clearly, the degree of "searing" or sealing of surface abrasions which occurs in the successful practice of this invention will depend almost entirely on the type of contacting with the flame that is achieved. This relates directly to such factors as the speed with which the sheet is drawn through the primary cone of the flame as well as the total area of contact between the flames primary cone and the film surface.

Generally, the rate of travel of the surface of the sheet should be such that the period of residence of every point of the heated area thereof in the primary cone of the flame is not sufficient to sear all of the surface of the sheet at that point, and clearly is not sufficient to distort the sheet. Thus, the total exposed surface of the sheet must not be heated (seared) to a temperature above the melting point of the sheet material for a sufficient time to cause the sheet to distort. Ideally, the contacting between film surface and primary cone of the hydrocarbon gas flame is so brief that only the minor "points" and sharp edges along the various skin abrasions described hereinbefore are actually melted (to thereby "heal" the defect to an extent sufficient to prevent the "site" from inducing polyester crystallization). Thus, limiting this melting or softening treatment to only the surface blemishes, per se, rather than the entire surface of the film has the advantage that essentially no adverse effects on the film are produced by the practice of this invention.

In the successful practice of the instant invention, flames which have been adjusted for about maximum heat and stability have been found useful when combined with sheet speeds of from about 20 to about 130 feet per minute. It is also very important that the primary cone of the hydrocarbon gas oxygen flame extend for a linear distance of only from about 0.02 to about 10 centimeters along the film surface as the film is passed quickly therethrough. Improved results have been produced when sheet speeds of from about 25 to about 45 feet per minute were used.

In a preferred embodiment of the invention sheets of poly(ethylene terephthalate) ranging in thickness from about 25 to about 80 mils were treated in accordance with the preferred method of this invention and were found to produce particularly good and clear sheets (essentially free of the printoff" defect) at a relatively rapid rate, when passed through about 2 cm. of primary cone flame at these speeds.

An outstanding feature of this invention which should be noted at this point is the extremely rapid transfer of heat achieved by reason of the high temperature flame utilized. The high temperature of the primary cone flame at about its tip, when combined with the relatively high speed of the moving sheet specified above provides that only the aforementioned surface portions of the sheet are heated to "flame polish" the surface scratches and abrasions while the remaining portions of the sheet do not soften or distort as could occur with the application of a lower temperature flame (or some other source of heat for a longer period of time, for example.

Burners varying widely in design can be and are commonly employed in flame treating in a wide variety of polymeric films and sheets. Elongated burners whose openings permit the establishment and maintenance of a substantially uniform flame front and which are commonly referred to as ribbon burners are preferred in the successful practice of the instant invention. Included among such preferred burners are those whose discharge openings consist of one or more longitudinally disposed rectangular orifices defined preferably by adjustable lips and those whose discharge openings consist of multiple longitudinally disposed rows of holes the size and relative spacing of which is selected to contribute to flame uniformity which is an all important factor in the instant invention if a uniformly improved surface is to be produced.

It has further been found extremely beneficial, although not critical to the successful practice of the present invention, to have the transport roll or roller designated at 18 in FIG. 1, which roller supports the sheet during the flame treatment process by means of its contact with the surface of the sheet opposite that which is being treated with the flame, temperature controlled and further preferably cooled using either an interior or exterior coolant circulating technique during flame treatment. When such a cooling roller is applied to the surface of the sheet opposite that which is being flame treated its temperature can be adjusted by control of the temperature and rate of flow of coolant to insure that practically the entire remainder of the film (other than the surface blemishes, per se) be neither seared nor partially or totally fused in the course of the flame treatment operation. In this fashion (by adjusting sheet speed, area of flame contact and/or sheet temperature and flame temperature or character), the exact amount of the film to be fused can be very carefully adjusted and the machine can be adapted to handle a variety of film or sheet thicknesses by adjusting these variants. By using the cooled transport roller it is insured that the sheet retains its strength during flame treatment and can be advanced by the rollers at a higher speed and without the necessity for undue precautionary measures being taken to assure that too much of the film is not seared.

As mentioned above, the cooling roller, if utilized can be cooled either interiorly by having a suitable coolant either a liquid such as water or a gas such as from circulating therein, or alternatively, the roller may be cooled exteriorly as for example by having a cooling liquid applied externally to the peripheral surface of the roller between the roller and the untreated surface of the sheet.

Depending upon the nature of the linear polyester sheet being treated, the temperature control feature of the subject roller may be eliminated entirely with the amount of the fused portion of the sheet being regulated as described above by flame temperature and sheet speed with increased speeds and smaller flame contact areas reducing the actual amount of the sheet affected, and increased flame contacting areas and temperatures and decreased sheet speeds increasing the affected amount of surface thereof.

In a preferred manner of carrying out the invention, the treating flame is produced by burning a mixture of oxygen, oxygen enriched air or just plain air and a hydrocarbon fuel gas such as propane, butane, ethane, ethylene, acetylene, natural gas or a mixture of such gases. The use of an oxygen or oxygen enriched air-fuel gas flame mixture enables the desired temperatures to be readily achieved with a flame having a relatively smaller volume whereby important economies can be achieved in the quantities of fuel gas and/or oxygen and air that are required to treat a given area of linear polymeric sheet. Also, because of the relatively small quantities of fuel gas that are burned during the treatment, the volume of the products of combustion will be at a minimum so that there will be little or no difficulty with condensation of the water vapor in the products of combustion on the sheet surface and therefore no need for drying the treated surface prior to any further treatment. While the proportions of the hydrocarbon gas and oxygen and/or air may be regulated to give a neutral, oxidizing or reducing flame, with corresponding changes in the flame temperature, best results are obtained with a neutral or slightly reducing flame.

Thus, the invention provides a simple, novel and relatively easily installed, operated and maintained apparatus and method for the elimination of the "printoff" problem which has hindered the production of linear polyester films of high clarity and uniformity in processes where orientation by drafting, tentering and/or stretching and heat setting is performed subsequent to the application of attack agent containing subs.

The invention has been described in detail with particular reference to preferred embodiments thereof, but it will be understood that variations and modifications can be effected within the spirit and scope of the invention.

What is claimed is:

1. In a process for manufacturing subbed and oriented sheets of linear polyester materials having repeating glycol and diacyl residues in their chains wherein an aqueous sub containing an attack agent is applied to at least one surface of said linear polyester sheet prior to orientation; the improvement which comprises passing the surface of said linear polyester sheet through the primary cone of a hydrocarbon gas flame just prior to the application of said sub at a speed such that the period of contact on said surface of said sheet with said primary cone is sufficient to sear at most, only the surface of said sheet to heal the small surface abrasions or scratches by melting the ragged edges of the abrasions and fusing them into a more homogeneous surface.

2. The improved process of claim 1 wherein said linear polyester material is poly(ethylene terephthalate).

3. The improved process of claim 1 wherein said sheet is passed through said primary cone of said flame at a rate of from about 5 to about 130 feet per minute; said flame extending for a linear distance of from about 0.02 to about 10 centimeters along said surface.

4. The improved process of claim 3 wherein said linear polyester is selected from the group consisting of poly(ethylene terephthalate) and poly(1,4-dimethylenecyclohexylene terephthalate).

5. The improved process of claim 3 wherein said linear polyester sheet is caused to pass over a cooled rotating roller so that one surface of said sheet is maintained in contact with said roller while a localized thickness of the opposite surface of said sheet is simultaneously passed through said primary cone of said hydrocarbon gas flame.

6. The improved process of claim 3, wherein said rate is from about 25 to about 45 feet per minute.

References Cited

UNITED STATES PATENTS

| | | | |
|---|---|---|---|
| 2,627,088 | 2/1953 | Alles et al. | 117—34 |
| 2,632,921 | 3/1953 | Kreidl | 264—80 |
| 2,683,894 | 7/1954 | Kritchever | 264—80 |
| 2,746,084 | 5/1956 | Kreidl | 264—80 |
| 3,072,483 | 1/1963 | Trevoy et al. | 117—34 |
| 3,255,034 | 6/1966 | Covington et al. | 264—80 |
| 3,271,178 | 9/1966 | Nadeau et al. | 117—7 |
| 3,375,126 | 3/1968 | Nagel | 117—47A |
| 3,460,982 | 8/1969 | Appelbaum | 117—34 |

ROBERT F. WHITE, Primary Examiner

G. AUVILLE, Assistant Examiner

U.S. Cl. X.R.

117—34, 47

PO-1050
(5/69)

UNITED STATES PATENT OFFICE
CERTIFICATE OF CORRECTION

Patent No. 3,590,107                Dated June 29, 1971

Inventor(s) Edward W. Smith, Jr. and Arthur W. Spencer

It is certified that error appears in the above-identified patent and that said Letters Patent are hereby corrected as shown below:

1. Column 2, line 68, delete "faces away from the roll so that a minimum of abrasion"; line 69, after "subbing" insert --faces away from the roll so that a minimum of abrasion"..

2. Column 4, line 19, after "this" insert --(--; same line, after "softening" insert --)--; line 20, delete "blenmishes" and substitute --blemishes--; line 31, delete "Inmproved" and substitute --Improved--; line 39, after "the", insert --"--; line 53, after "heat" insert --)--.

Signed and sealed this 11th day of January 1972.

(SEAL)
Attest:

EDWARD M. FLETCHER, JR.                ROBERT GOTTSCHALK
Attesting Officer                      Acting Commissioner of Patents